(12) United States Patent
Lomerson, Jr.

(10) Patent No.: US 8,251,415 B2
(45) Date of Patent: Aug. 28, 2012

(54) END EFFECTOR WITH SUCTION CUPS HAVING INTERNAL VALVES

(75) Inventor: Roland Lomerson, Jr., Lakewood Ranch, FL (US)

(73) Assignee: AMF Automation Technologies, LLC, Richmond, VA (US)

( * ) Notice: Subject to any disclaimer, the term of this patent is extended or adjusted under 35 U.S.C. 154(b) by 318 days.

(21) Appl. No.: 12/763,242

(22) Filed: Apr. 20, 2010

(65) Prior Publication Data

US 2011/0254298 A1 Oct. 20, 2011

(51) Int. Cl.
*A47G 21/10* (2006.01)

(52) U.S. Cl. .................. 294/2; 294/65; 901/40

(58) Field of Classification Search .......... 294/2, 183, 294/64.2, 65; 901/40; 414/627, 404, 737, 414/752.1; 251/61, 61.2, 63.5
See application file for complete search history.

(56) References Cited

U.S. PATENT DOCUMENTS

| | | | |
|---|---|---|---|
| 3,558,171 A | 1/1971 | Netsch et al. | |
| 4,078,671 A | 3/1978 | Lundstrom | |
| 4,355,936 A | 10/1982 | Thomas et al. | |
| 4,787,812 A | 11/1988 | Gopfert | |
| 4,850,627 A | 7/1989 | Franklin | |
| 5,024,575 A | 6/1991 | Anderson | |
| 5,088,878 A | 2/1992 | Focke et al. | |
| 5,609,377 A | 3/1997 | Tanaka | |
| 5,752,729 A | 5/1998 | Crozier et al. | |
| 5,813,713 A | 9/1998 | Van Den Bergh | |
| 6,860,531 B2 | 3/2005 | Sherwin | |
| 7,000,964 B1 | 2/2006 | Porras et al. | |
| 7,017,961 B1 | 3/2006 | Parnell et al. | |
| 7,134,833 B2 | 11/2006 | de Koning | |
| 7,648,182 B2 | 1/2010 | Salimkhan | |
| 7,828,351 B2 | 11/2010 | Baumstimler | |
| 7,950,708 B2 | 5/2011 | Parnell | |
| 2007/0059149 A1 | 3/2007 | Rich | |
| 2009/0206619 A1 | 8/2009 | Schmidt et al. | |
| 2010/0040450 A1 | 2/2010 | Parnell | |
| 2011/0254298 A1 | 10/2011 | Lomerson, Jr. | |

OTHER PUBLICATIONS

M-420iA/M-421iA, Fanuc Robotico Brochure 2007, 10 pages.

*Primary Examiner* — Dean Kramer
*Assistant Examiner* — Stephen Vu
(74) *Attorney, Agent, or Firm* — Thomas, Kayden, Horstemeyer & Risley, LLP (57) ABSTRACT

An air retriever, such as a bellows (24) is used in an end effector (18) for lifting work products (22) in prearranged configurations, and delivery to a container (20) in a predetermined pattern. An air flow control valve (50) is positioned in each bellows (24) for individually controlling the flow of air through each bellows so that the bellows in a pick zone may draw air for picking up work products while air flow is not applied to the other bellows out of the pick zone.

13 Claims, 13 Drawing Sheets

END EFFECTOR WITH SUCTION CUPS HAVING INTERNAL VALVES

TECHNICAL FIELD

The present disclosure concerns a robotic packaging apparatus having an end effector for collecting work products of different shapes and sizes in different patterns for delivery to a receptacle, such as a shipping container. The end effector includes multiple retrievers such as suction cups for controlling the air flow through the suction cups.

BACKGROUND OF THE DISCLOSURE

In robotic packaging operations, a producer might desire to ship work products in shipping containers of a standard shape and size. The shape and size of the individual work products might be different from one job to the next. In order to ship in standard size containers it may be required to retrieve and collect the products of one size and shape on the end effector of the robot in a different pattern than for other products.

For example, in the bakery industry a producer typically will produce several sizes of loaves of bread from time to time and have one basket size in which the producer ships the products. The different size products may fit best in the basket when configured in different arrangements or pack patterns than other sized products. The pack patterns are dependent on the product sizes. A robot may be used to pick the products up from a line of the products with multiple picks of the end effector of the robot at various orientations of the end effector with respect to the line of products to form the desired pattern of the products on the end effector. Once loaded with the work products in the desired pattern, the robot moves the end effector to the basket and the robot then deposits the products into the basket all at once in the desired pattern.

Usually a single vacuum source with high flow and low vacuum level for the pick-up force is desirable and most commonly used. The end effector may include multiple vacuum retrievers in the form of bellows suction cups as the vacuum retrievers to provide the seal between the vacuum source and the objects being picked. When multiple picks are required to form the desired pattern of products for one delivery of the products to the basket, the vacuum must be applied to certain suction cups on the end effector to enable picking or holding of the product in that pick group while other groups of the suction bellows must not allow vacuum flow because those zones of the end effector either are not yet covered by work products or the positions are to be left empty. To accomplish this, the vacuum source may be split in several tubes and then the tubes are valved open or closed to allow vacuum to flow to different sectioned-off portions of the suction surface of the end effector.

The system described above is not ideal when several different groups of retrievers are required to conduct the picking functions and/or the groups of retrievers must change in shape for picking different products. If there are too many pick groups of vacuum retrievers then the vacuum lines become small and restrict the vacuum flow.

A common solution was to provide multiple end effectors that have 2 to 6 pick groups in the suction surface strategically placed for the specific pattern or similar patterns that it is designed for. This is cost prohibitive as some producers may have many different shaped and sized products and would require many different end effectors.

Similarly, another method of having a non-grouped end effector was to have the vacuum source connected with a large hose to a large plenum. The bottom of the plenum is then populated with multiple suction retrievers that allow high flow between the retriever and the plenum. This may be a solution to some of the problems but is limited because the retrievers are not grouped and therefore might not perform multiple picks. If multiple picks are attempted then the first pick might fail due to air leakage through the other open cups.

Also, most of the prior art end effectors occupy a large vertical space to accommodate the various hoses for directing the air flow from the retrievers to the vacuum plenum chamber and are heavy and, therefore, tend to be expensive to construct, maintain, repair and/or operate.

Therefore, there exists a need for an improved universal end effector that can be programmed to open vacuum flow to only selected groups of its suction cups as required to form desired patterns or zones of suction, and may be formed in a compact durable configuration. Also, there is a need for an end effector that would allow a high volume of vacuum flow to each suction cup that is to engage the work product substantially without loss of sub-atmospheric pressure of the vacuum source through conduits leading to the suction cups and without complex and restrictive conduits and multiple hoses.

SUMMARY OF THE DESCRIPTION

Briefly described, one form of the following disclosure concerns an end effector of a robot for retrieving work products in a selected pattern from an accumulation of work products and for placing the retrieved work products in the selected pattern in a receptacle. The end effector may include a vacuum plenum housing with an array of vacuum retrievers extending down from said vacuum plenum housing for engaging the work products. A valve may be positioned in each vacuum retriever that separates each vacuum retriever into an upper chamber in communication with vacuum plenum housing and a lower chamber in communication with the atmosphere for engaging the work products. The valve defines an air passage between upper chamber or the vacuum retriever and lower chamber of the vacuum retriever for the movement of air from the lower chamber to the upper chamber and into said vacuum plenum. The valve includes a valve element movable in the upper chamber into and out of blocking relationship with the air passage.

The vacuum retrievers may be cup-shaped bellows with annular protrusions, and the valve may be supported in said bellows at one of said annular protrusions.

The bellows may be constructed so that in response to the valve in a bellows closing the bellows contracts while the other bellows with open air passages that are to be used to engage the work products remain longer than the contracted bellows.

The air control valves may be a valve plate supported in a fold of the bellows and a valve element that engages the valve plate.

This disclosure includes a method of selectively robotically collecting work products in a selected pattern from an accumulation of work products and placing the work products in a receptacle. The method includes orienting an end effector to engage some of the work products in the accumulation of work products with a plurality of vacuum retrievers in a first group of the vacuum retrievers, applying a sub-atmospheric air pressure to the vacuum retrievers in the first group of vacuum retrievers while avoiding drawing an air pressure in the remaining vacuum retrievers, and retrieving work products from the accumulation of work products with the vacuum retrievers in the first group of the end effector. Then re-orienting the end effector with respect to the accumulation of work products and re-engaging the accumulation of work products with a second group of the vacuum retrievers. Sub-atmospheric air pressure is applied to the vacuum retrievers in both the first and second groups of vacuum retrievers, and the work products are retrieved with the vacuum retrievers in the second group of the end effector. These steps may be repeated for several picks until the desired pattern of work products are gathered on the end effector. Then the end effector places the work products in registration with a receptacle, and the sub-atmospheric air pressure to the work products is terminated to release the work products from the end effector.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
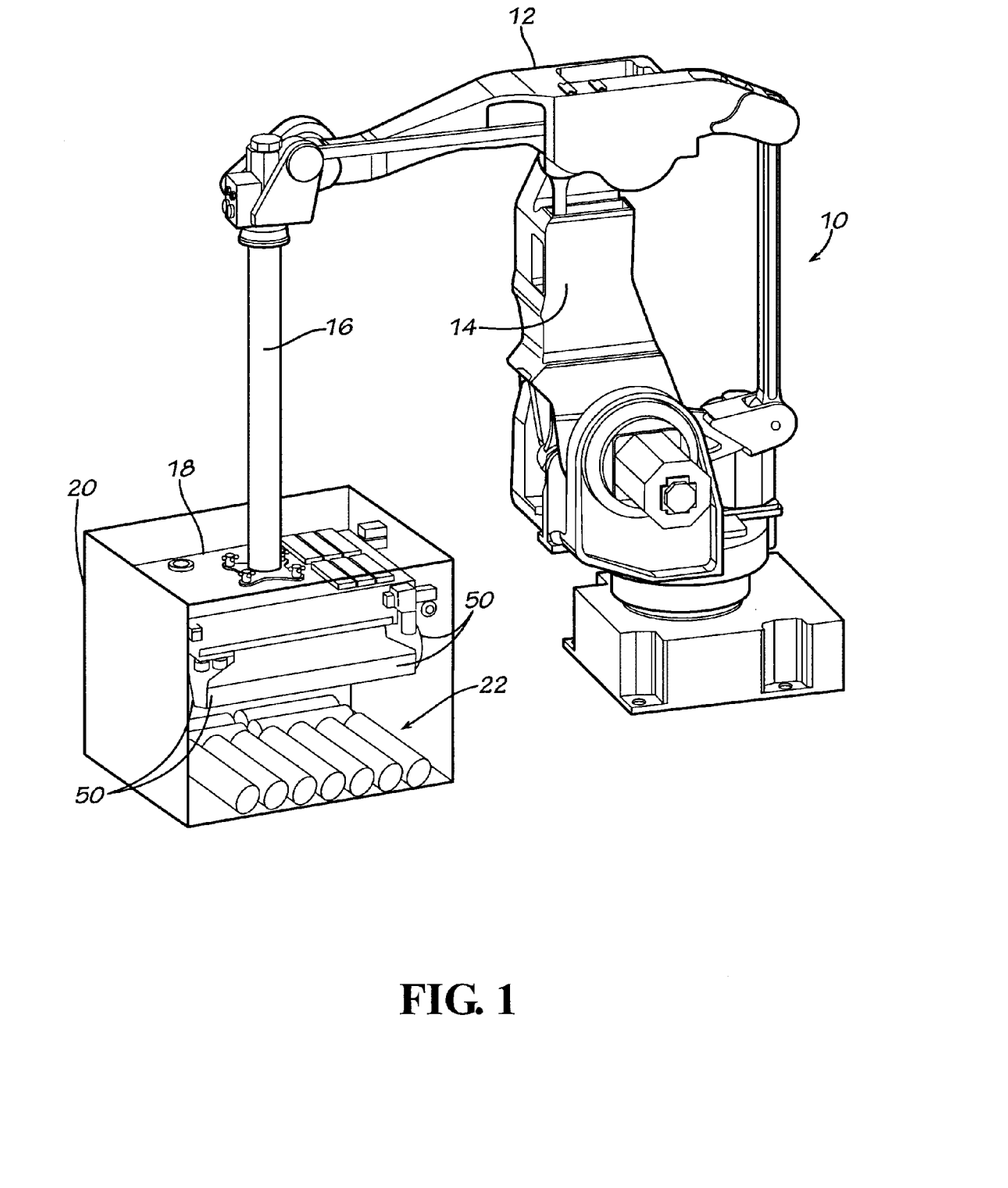
FIG. 1 is an isometric view from a high perspective of a robot and its vacuum assisted programmable zoned end effector and the standard receptacle for receiving the work product.
Figure 2:
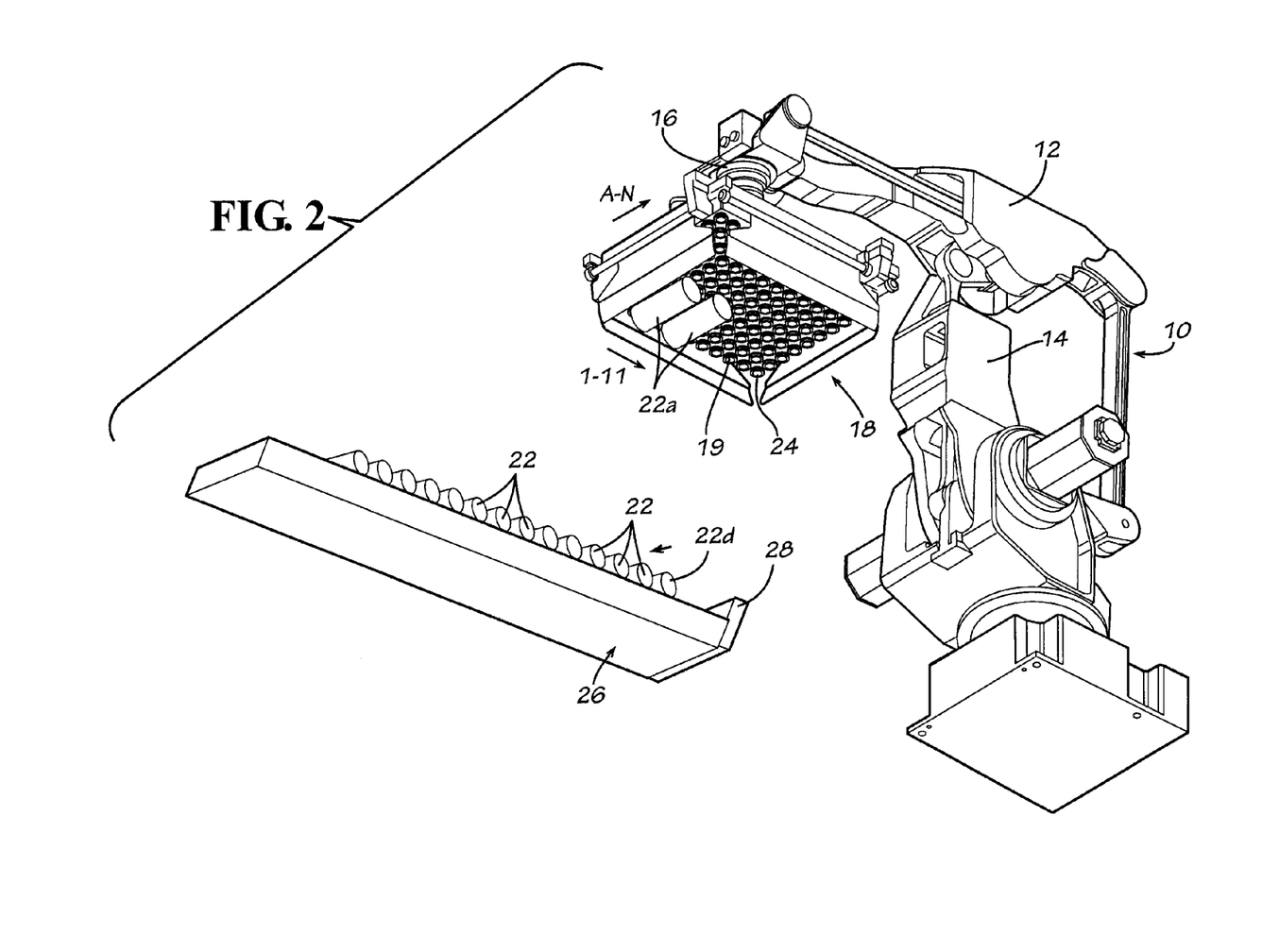
FIG. 2 is an isometric view from a low perspective of the robot and its end effector of FIG. 1, showing how some of the vacuum retrievers of the end effector have picked some of the work products.

Referring now in more detail to the drawings, in which like numerals indicate like parts throughout the several views, FIGS. 1 and 2 illustrate a robot 10 of conventional articulating design, being pivotal about an upright axis, having a rocker arm 12 mounted on a rotary stanchion 14, and control arm 16 that has the capacity to rotate in the distal end of the rocker arm 12. The end effector 18 is mounted to the distal end of the control arm 16 and its movements are controlled by a program entered in the robot's computer system. The end effector can be rotated, raised, lowered and moved in lateral directions, as is common in the art and in accordance with its programmable control system.

As shown in FIG. 1, the end effector 18 has been placed in alignment with the receptacle 20 which is a packing container. The work products 22 have been released by the end effector 18 and have been deposited on the bottom wall of the receptacle 20. In the embodiment illustrated, the receptacle is a box-shaped item but may be a basket, tray, pallet, or various other receptacles or surfaces. For purposes of illustration, without restriction, the invention is disclosed herein as being an apparatus and product for packing bakery products such as bread, buns, English muffins, bagels, hot dog buns and loaves of bread, and the details of the invention are directed to work products of in shapes of packaged loaves of bread 22. However, other work products in various shapes may be handled with this invention.

FIG. 2 shows the robot 10 from a lower perspective, showing the end effector 18 in a position that reveals the suction surface 19 of the end effector. The suction surface 19 includes an array of vacuum retrievers, such as the corrugated or "bellowed" suction cups 24 that are to be applied to and that are to pick the loaves of bread 22 or other work product.

Figure 3:
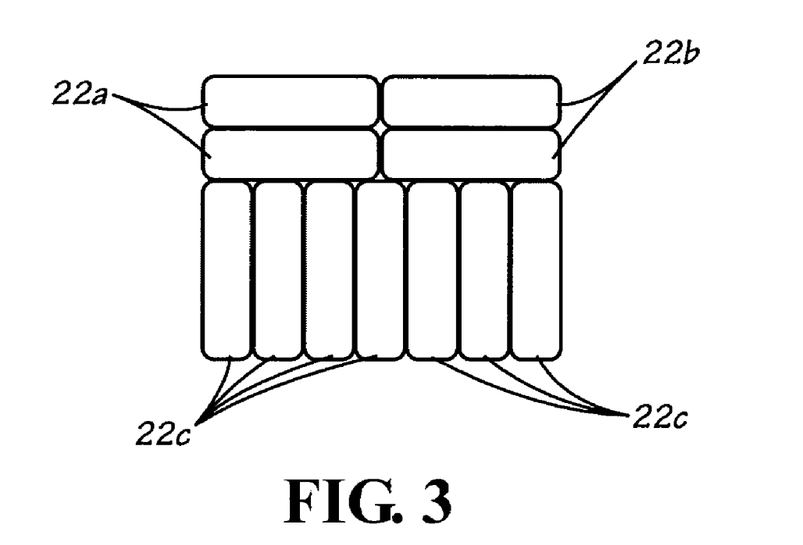
FIG. 3 is a diagram of a plan view of a desired configuration of the work product on the vacuum assisted zoned end effector as picked from an accumulation of the work products when to be delivered to a standard receptacle.
Figure 4:
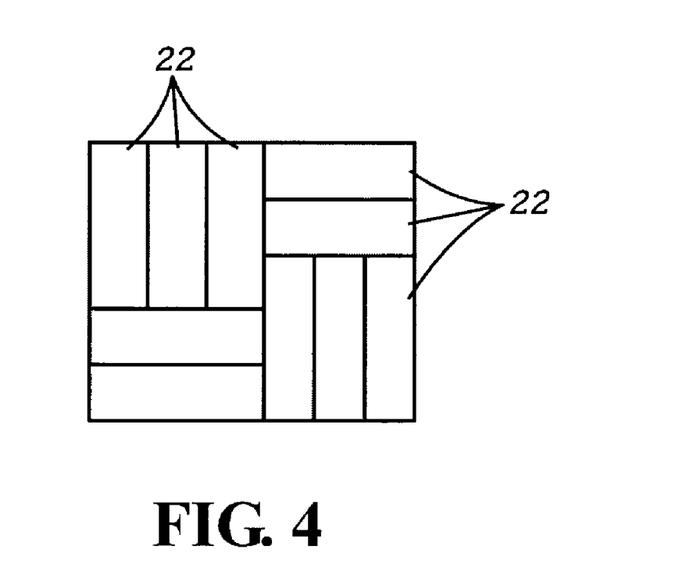
FIG. 4 is a diagram of another example of a desired configuration of the work product on the vacuum assisted zone end effector.

FIGS. 3 and 4 show sample arrangements of a layer of loaves of bread 22 when placed in a receptacle. A typical loaf of bread may be four inches wide and fourteen inches long, wrapped in a plastic film bag that has extra material gathered at one end to close about the end of the loaf. An example of the basket used by the producer to ship the loaves may have an inside dimension of twenty-two inches by twenty-eight inches.

The desired pattern for best fitting the most loaves of this size in this size basket is shown in FIG. 3 and is to have loaves end-to-end on the twenty-eight inch dimension side of the basket. Next, another two loaves are placed end-to-end against the first two loaves. Finally seven loaves are turned perpendicular to the previous loaves so that their fourteen inch dimension fits the remaining fourteen inch available space in the basket. This allows eleven loaves per basket which is the most loaves possible for this size loaves in this size basket. If the loaves are of a different shape or size, or if the receptacle is of a different shape or size, the arrangement of the loaves is likely to change to better fit the dimensions of the receptacle.

The basket for the loaves in the arrangement of loaves of FIG. 4 may be of different dimensions or the loaves may be different in size from FIG. 3, so the best arrangement of loaves 22 may be different. FIG. 4 shows a packing arrangement for 10 loaves.

Figure 5:
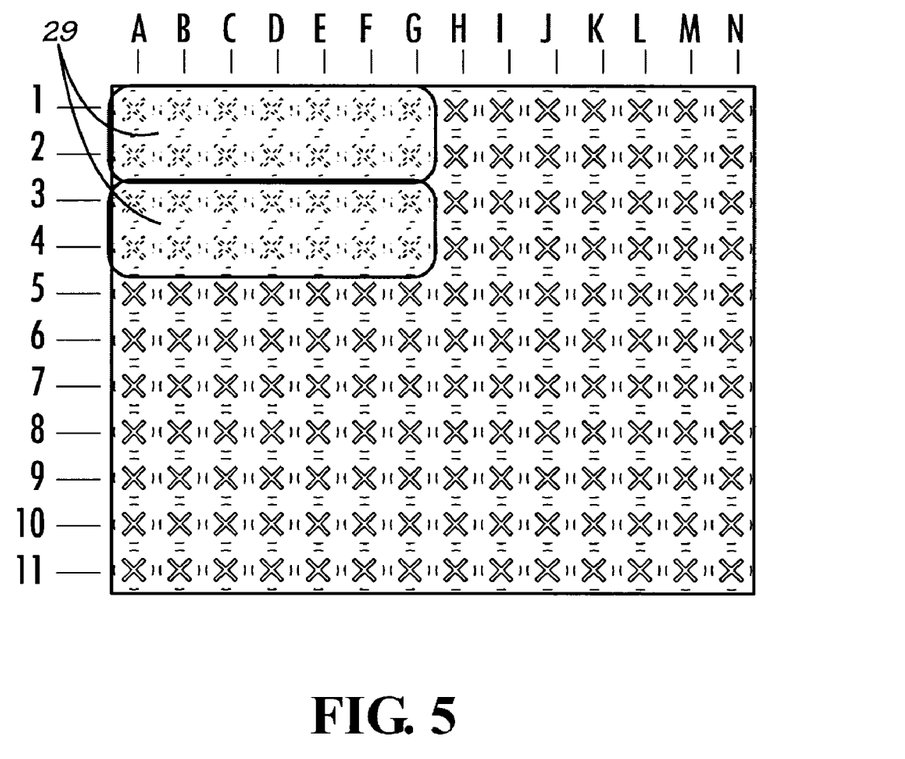
FIG. 5 is a diagram of the work products as picked by the end effector of FIG. 2.

As shown in FIG. 2, an array of vacuum retrievers in the form of suction cups 24 on the suction surface 19 of the end effector is formed in a rectangle, with the suction cups arranged in columns and lines. As shown in FIG. 5, the suction cups are identified by columns and rows, with the columns identified as A-N and the rows identified as 1-11. It will be noted that FIG. 5 shows that the first pick 29 is of two loaves of bread 22A that occupy suction cups in columns A-G and rows 1-4.

As shown in FIG. 2, when the loaves of bread have been bagged in a bagging machine, they are moved on a surface conveyor 26 with their long dimension leading. The loaves are conveyed to the end of the surface conveyor against a stop 28 and are gathered at the stop in a side-by-side accumulation. Once several products accumulate, the robot may begin its picking functions.

Figure 6A:
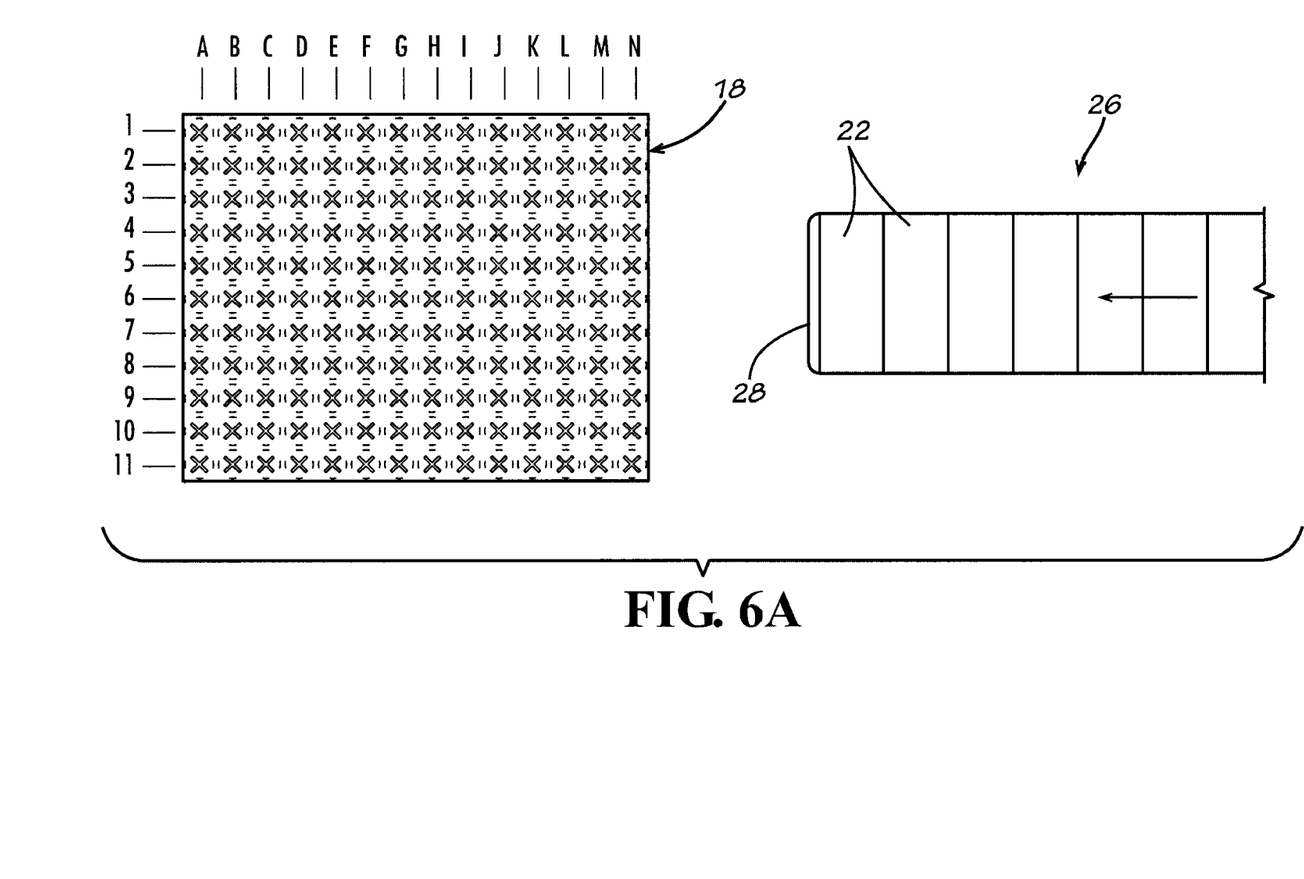
FIGS. 6A-6D are progressive illustrations of the vacuum face of the end effector, showing the pattern of the work products as they are progressively picked by the end effector.
Figure 6B:
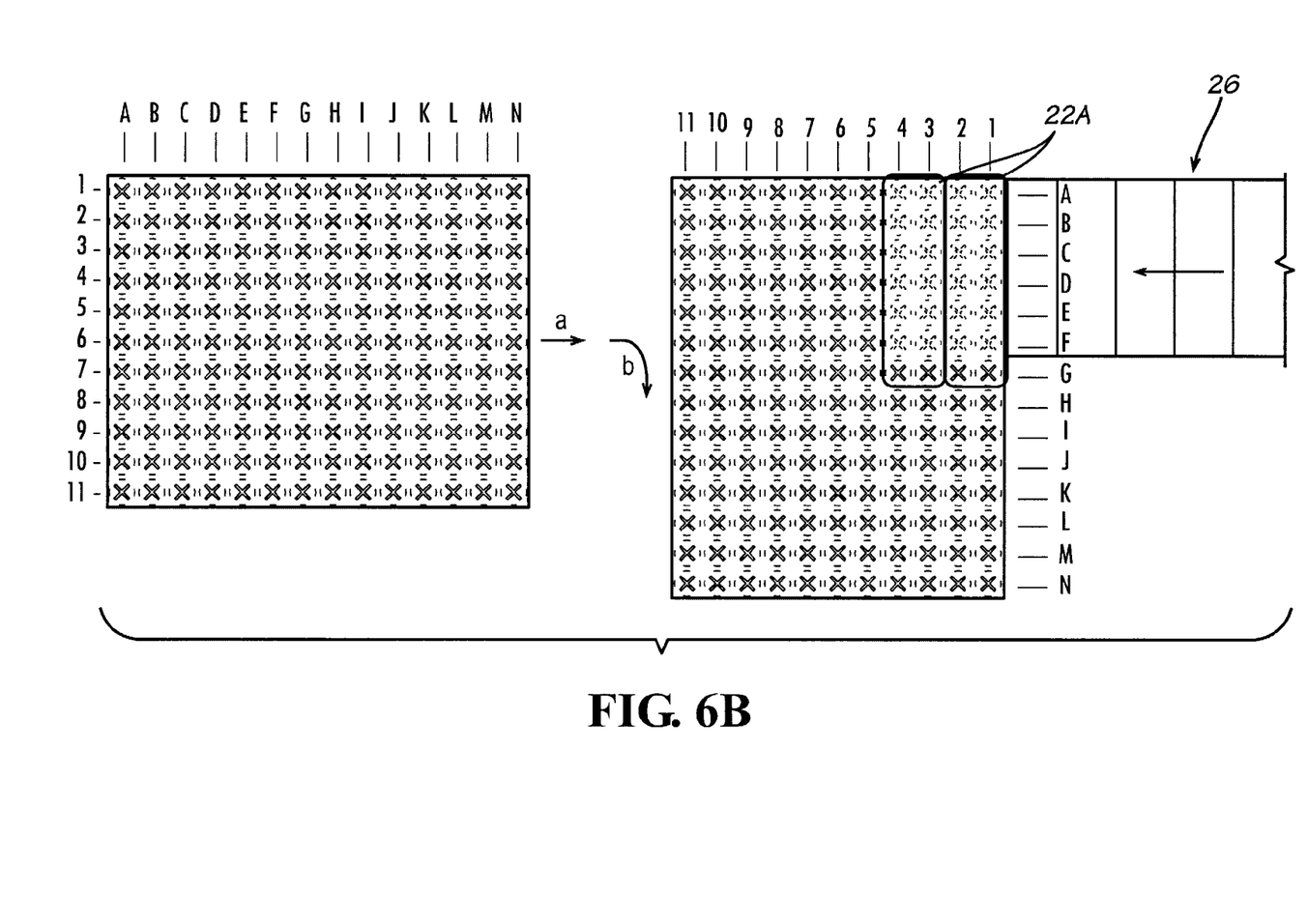

An example of the picking steps is shown in FIGS. 6A-6D. In this example, the programmable end effector 18 of FIG. 2 moves from its rest position of FIG. 6A over to the accumulation of loaves 22A on the surface conveyor 26 as shown in FIG. 6B. This movement is shown by arrows a and b. The end effector moves down onto the two end loaves 22 at the stop 28 of the surface conveyor 26 as shown in FIG. 6B and first picks loaves 22A at one corner of its suction surface 19. Suction is applied to suction cups in the zone identified as 1A to 1G, 2A to 2G, 3A to 3G, and 4A to 4G. The end effector then holds the two loaves on its suction surface 19.

Figure 6C:
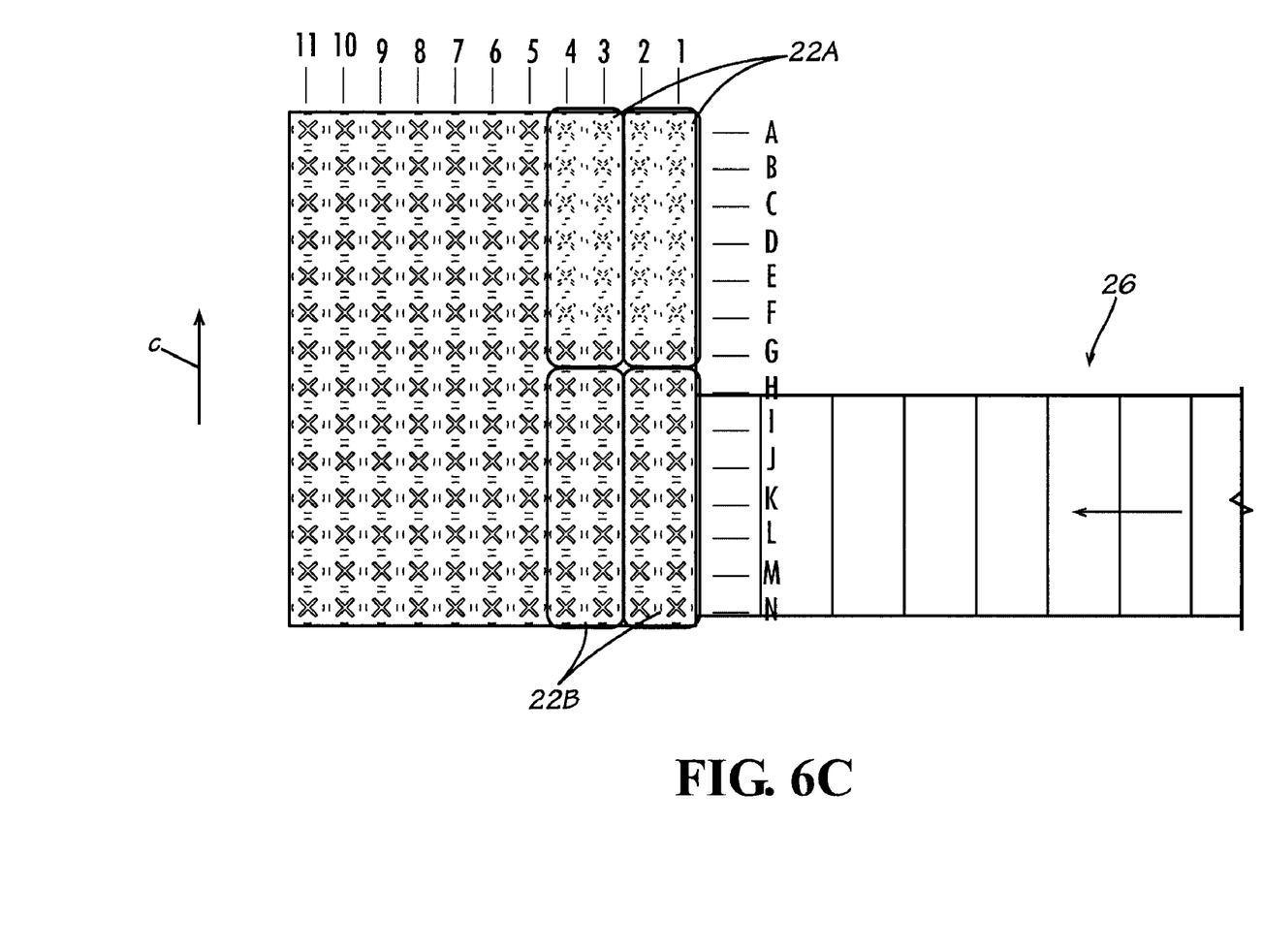

When the first loaves 22A have been picked away from the accumulation of loaves on the conveyor, the conveyor advances the accumulation of loaves to the conveyor stop 28. As shown by FIG. 6C, the robot then moves the end effector over the end loaves as shown by arrow c and picks two more loaves 22B in alignment with the first two loaves 22A by again coming down over and retrieving the loaves. Suction is applied to suction cups in the chamber identified as 1H to 1N, 2H to 2N, 3H to 3N, and 4H to 4N. The end effector then holds all four loaves on its suction surface 19 and the surface conveyor again advances its accumulation of loaves to the end stop 28.

Figure 6D:
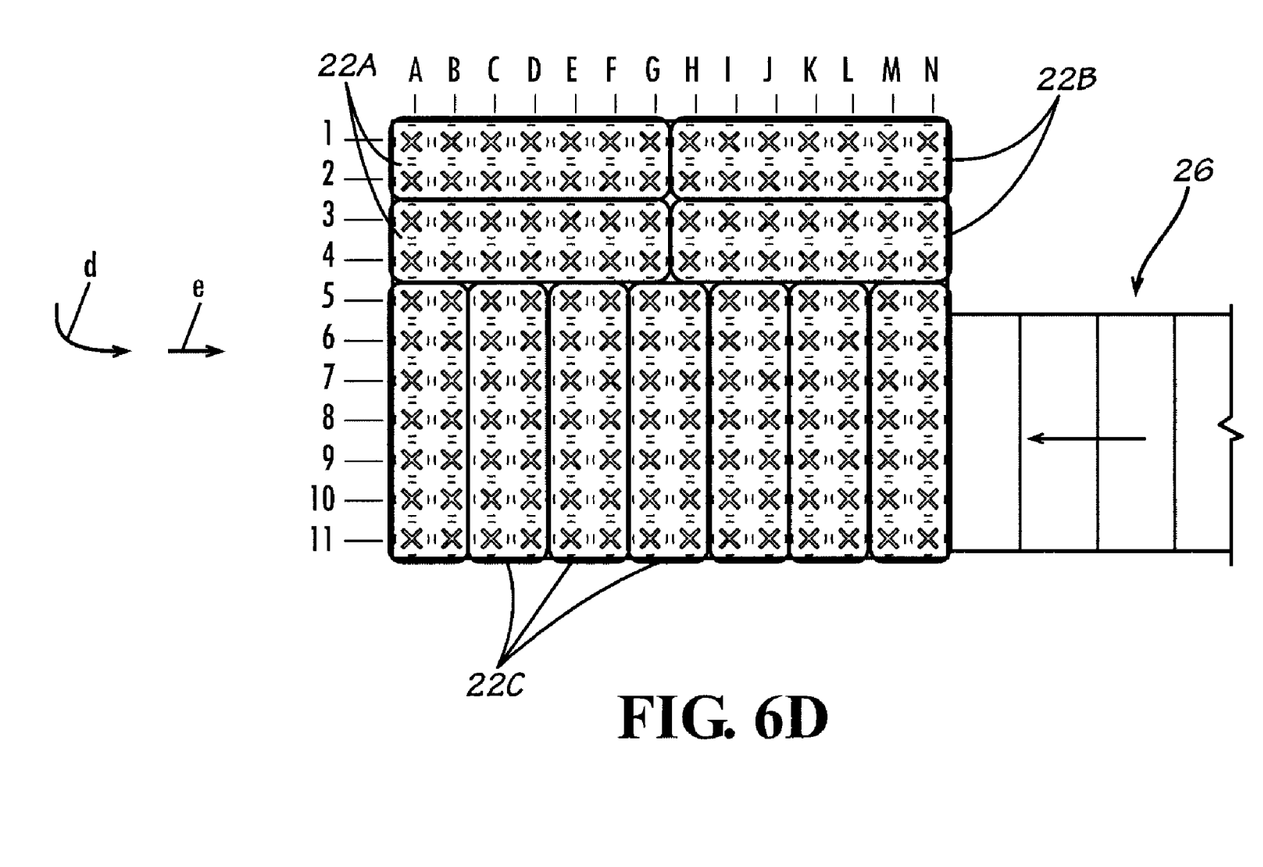

As shown in FIG. 6D, the robot then rotates the end effector 90 degrees as shown by arrow d and moves the end effector over as shown by arrow e to place the empty portion of the suction surface over the loaves on the surface conveyor. The empty portion of the suction surface 19 then picks seven loaves 22C in side-by-side arrangement. Suction is applied to suction cups in the pick chamber identified as columns 5-11 and columns A-N. All of the loaves are held on the suction surface of the end effector, and the robot moves the end effector into registration with the basket and releases the loaves into the basket.

Figure 7:
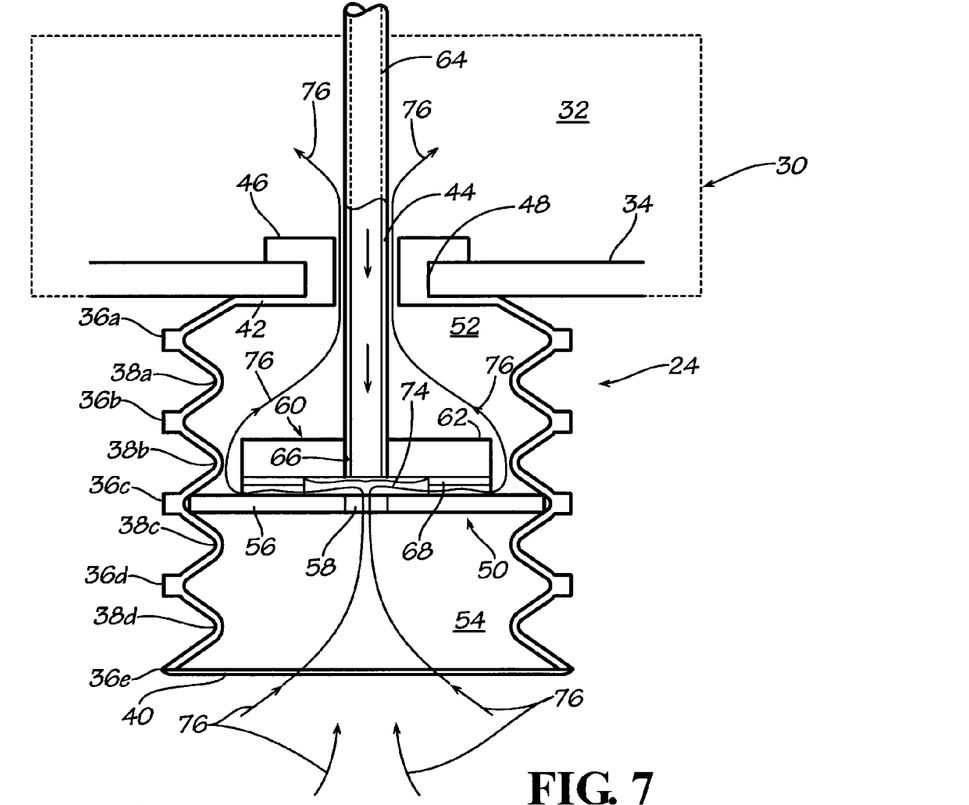
FIG. 7 is a side cross sectional view of a first embodiment of a vacuum retriever when the air control valve is open.

FIG. 7 illustrates in cross section one of the vacuum retrievers 24 that is generally indicated in FIG. 2 as part of the end effector 18. The vacuum retriever 24 is supported by the vacuum plenum housing 30 that is mounted on the end effector, with the lower wall 34 of the vacuum plenum housing illustrated in this figure. An air compressor (not shown) has its inlet in fluid communication with the vacuum plenum housing 30 so as to draw a sub-atmospheric pressure within the vacuum plenum 32, above the bottom wall 34 of the vacuum plenum housing 30.

The vacuum retriever 24 of FIG. 7 is illustrated as a collapsible bellows that is generally of inverted cup-shape. The bellows includes a plurality of alternating outwardly extending and inwardly protruding annular folds 36A-36E and 38A-38D, respectively, and open lower end 40 at the outwardly extending annular protrusion 36E, and a top wall 42. The top wall 42 defines an opening 44 and an annular collar 46. The top wall opening 44 is in open fluid communication with the vacuum plenum 32 through the top wall opening 44, and the mounting collar 46 firmly holds the bellows 24 in the bottom wall opening 48 of the bottom wall 34 of the vacuum plenum housing 30.

An air flow control valve is positioned in each of the vacuum retrievers. The valve separates each of the vacuum retrievers into an upper chamber 52 and a lower chamber 54.

Air flow control valve 50 may comprise a valve plate 56 that is mounted into one of the outwardly extending annular folds, such as fold 36C, so that the air flow control valve is movable with the movements of the bellows 24 when it contracts and expands. Valve plate 56 defines an air passage 58 that opens communication between the upper and lower chambers 52 and 54.

Valve element 60 is positioned in the upper chamber 52 above valve plate 56 and includes air distribution disk 62 that is mounted over the air passage 58 of the valve plate 56. High pressure conduit 64 extends downwardly from vacuum plenum 32 through the top wall opening 44 of the mounting collar 46 of the bellows, and extends through a central opening 66 of the air distribution disk so that it may communicate high pressure air to the bottom surface of the air distribution disk 62.

Figure 7A:
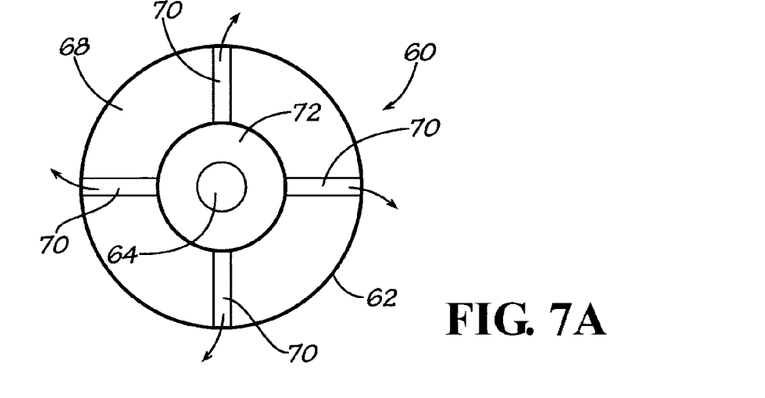
FIG. 7A is a bottom view of the valve plate that is used in the vacuum retriever of FIG. 7.

As shown in FIG. 7A, the bottom surface of air distribution disk 62 includes a flow diverter 68 that is in the form of an annulus with radiating air channels 70 formed therethrough, with the central opening 72 of the annulus registering with the air channels 70 and with the high pressure conduit 64.

A diaphragm 74 (FIG. 7) is sandwiched between the annular flow diverter 68 and the air distribution disk 62. The diaphragm is flexible and has the breadth sufficient to engage and close the air passage 58 of the valve plate 56.

High pressure air, air of greater pressure than the air in vacuum plenum 32, communicates with high pressure conduit 64 that extends vertically into the bellows 24 and is in communication with the diaphragm 74 and is used to control the movements of the diaphragm 74. When there is no supply of high air pressure through the high pressure conduit 64 to the diaphragm 74, the diaphragm is free to move away from air passage 58, thereby opening the air passage. The sub-atmospheric air pressure in vacuum plenum 32 will then induce a flow of air as shown by arrows 76, with the flow of air moving into the open lower end 40 of the bellows 24, moving upwardly through the air passage 58 of the valve plate 56, then turning radially to flow through the air channels 70 (FIG. 7A) of the air distribution disk 62, then turning upwardly into the upper chamber 52 of the bellows, then out through the space formed between the mounting collar 46 and the high pressure conduit 64, into the vacuum plenum 32.

When the diaphragm 74 opens the flow of air through the bellows 24 to vacuum plenum 32, the bellows is available to apply its lower end to a work product 32, and adhere to the work product so that upward movement of the end effector 18 will result in lifting the work product.

Figure 8:
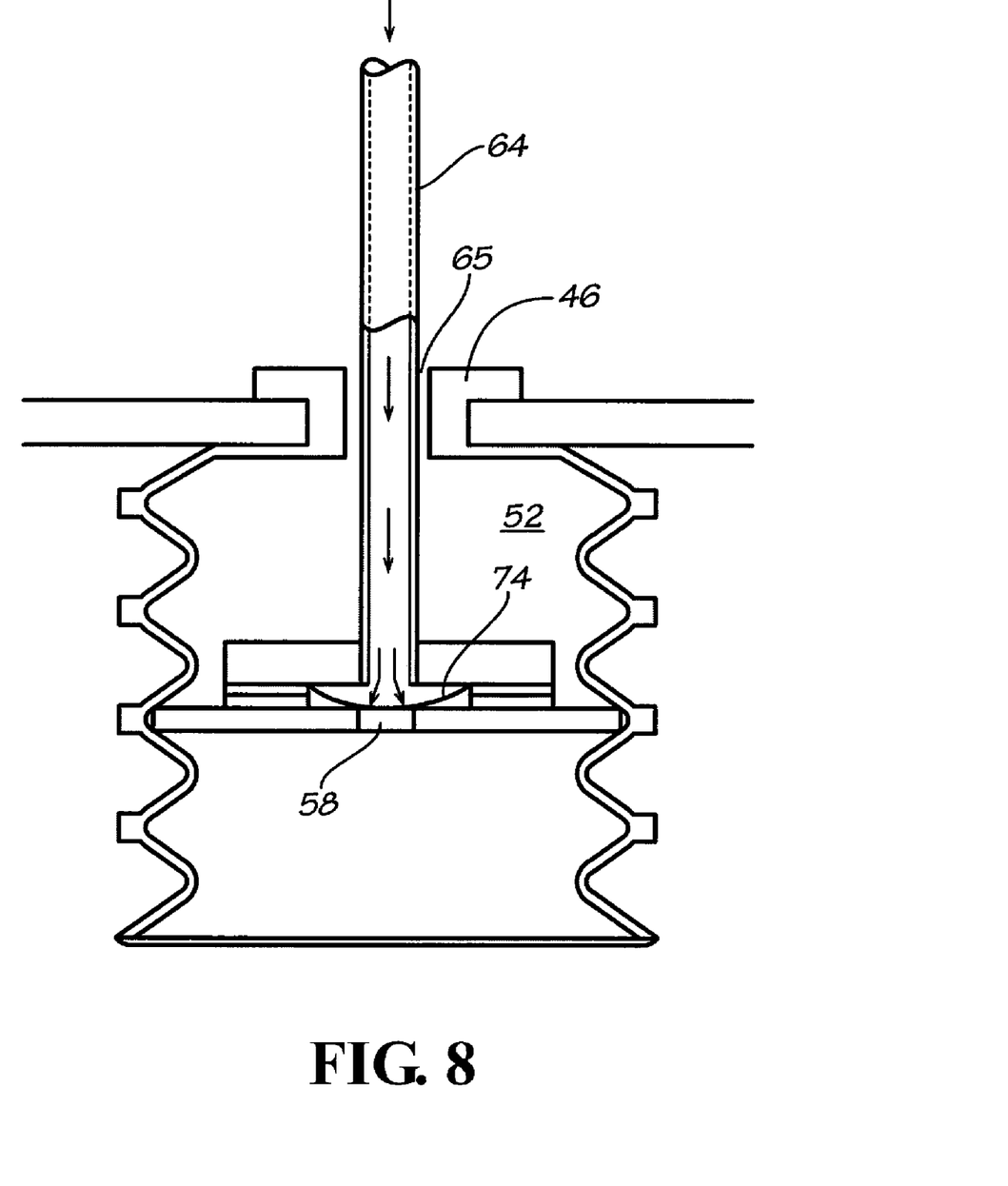
FIG. 8 is a side cross sectional view of the first embodiment of the vacuum retriever when the air control valve is closed.

When the end effector 18 has moved the work product 22 to a destination and the work product is to be released, high air pressure is moved downwardly through high pressure conduit 64 so that it moves the diaphragm 74 of the valve element 60 over the air passage 58, thereby blocking air passage 58 and terminating the flow of vacuum air into the open lower end 40 of the bellows, thereby releasing the work product. This condition is best shown in FIG. 8, where the diaphragm 74 is shown as covering the air passage 58.

Figure 9:
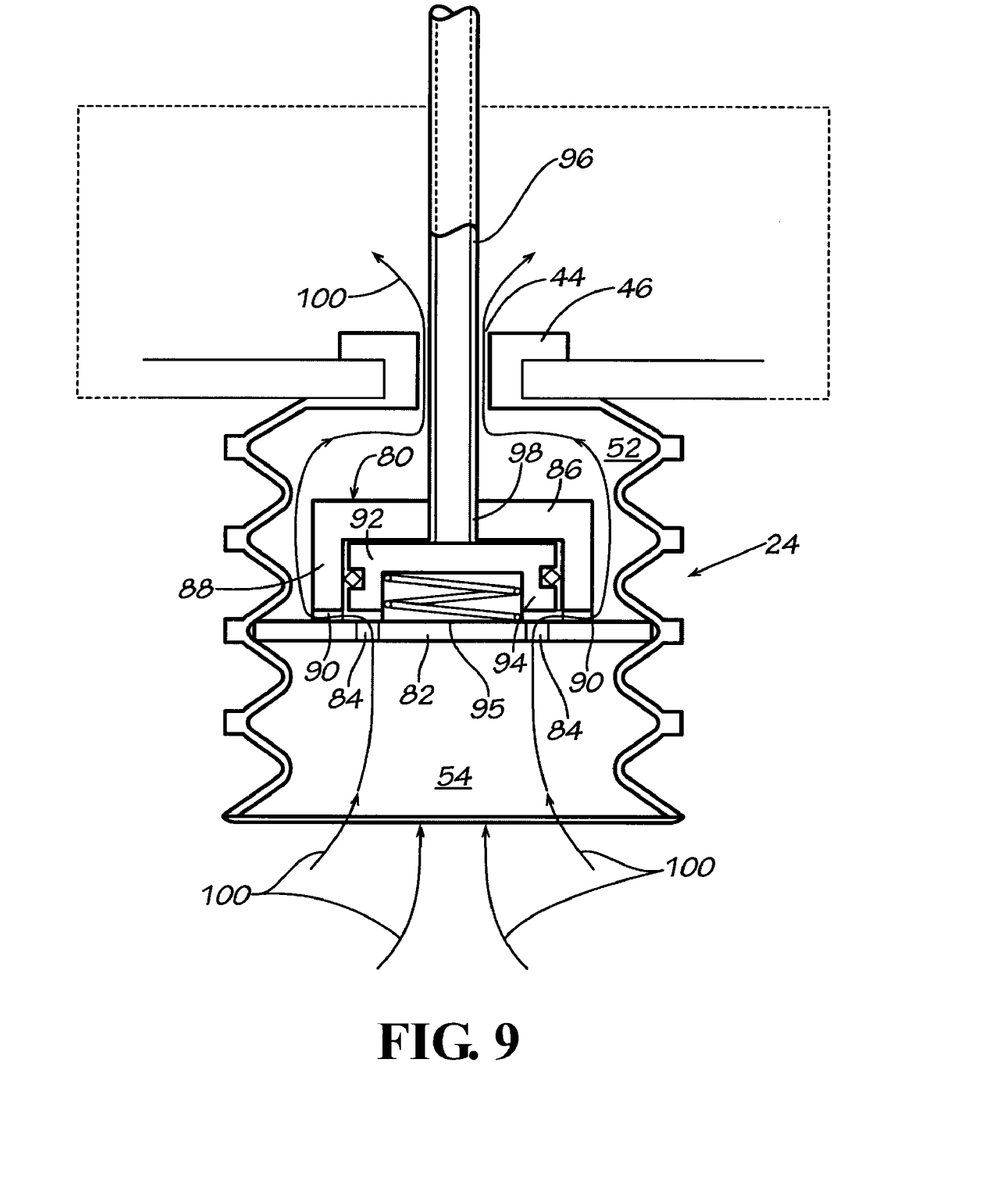
FIG. 9 is a side cross sectional view of a second embodiment of a vacuum retriever when the air control valve is open.

FIG. 9 shows another form of the disclosure, in that the valve element 60 of FIG. 7 is replaced by valve element 80. The valve plate 82 has radial air passages 84 that are shown in FIG. 10A to be placed at intervals around the center of the valve plate. Valve element 80 is made up of an inverted cup-shaped air distribution cup 86 that includes an annular rim 88 that engages valve plate 82, with radial air channels 90 formed in the edge of the rim, allowing the passage of air therethrough. Valve piston 92 is positioned in the hollow of the air distribution cup 86. Valve piston 92 is also cup-shaped and its annular rim 94 is aligned with the air channels 90. Coil compression spring 96 is positioned in the hollow of the cup-shaped valve piston 92, bearing upwardly against the valve piston and downwardly against the valve plate 82. This urges the valve piston out of blocking engagement with respect to air channels 84.

High pressure air conduit 96 extends downwardly from a vacuum plenum, through the mounting collar 46 of the bellows 24, through opening 98 in the base of the inverted air distribution cup 86 to supply air to the air distribution cup 86. The air supplied by the high pressure air conduit 96 increases the air pressure between the air distribution cup 86 and the cup-shaped valve piston 92, causing the valve piston 92 to move downwardly against the bias of coil compression spring 95, causing the rim 88 to block the air passages 84 that extend through the valve plate 82.

As illustrated by the air direction arrows 100 of FIG. 9, when the cup-shaped valve piston 92 is withdrawn under the influence of its spring 95 away from the air passages 84 of the valve plate 82, air is free to flow upwardly through the lower chamber 54 of the bellows 24, through the air passages 84 in the valve plate 82, then radially through the air channels 90 of the air distribution cup 86, then upwardly through the upper chamber 52, and upwardly through the space between the high pressure air conduit 96 and the top wall 92 of bellows 24, and out of the mounting collar 46.

Figure 10:
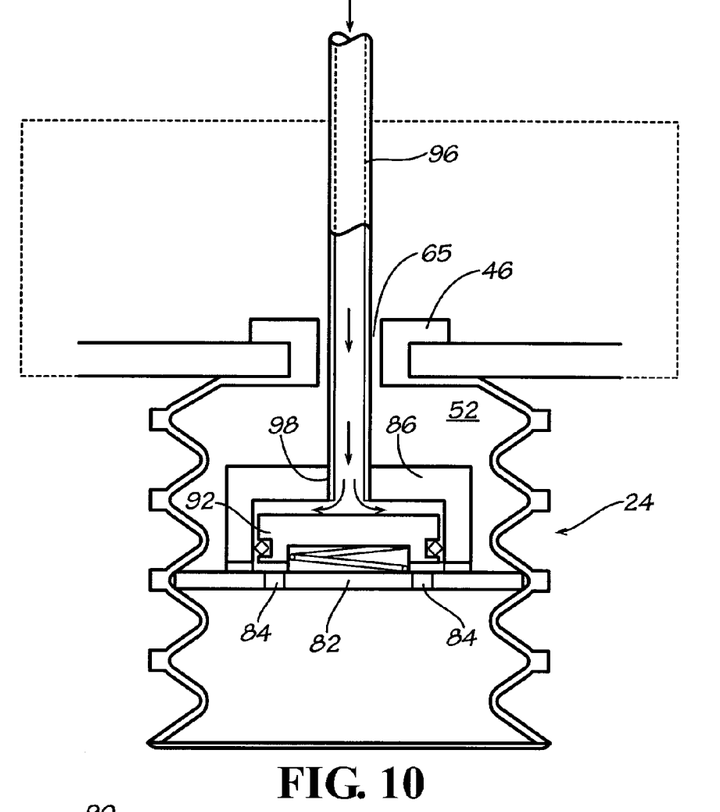
FIG. 10 is a side cross sectional view of the second embodiment of the vacuum retriever when the air control valve is closed.
Figure 10A:
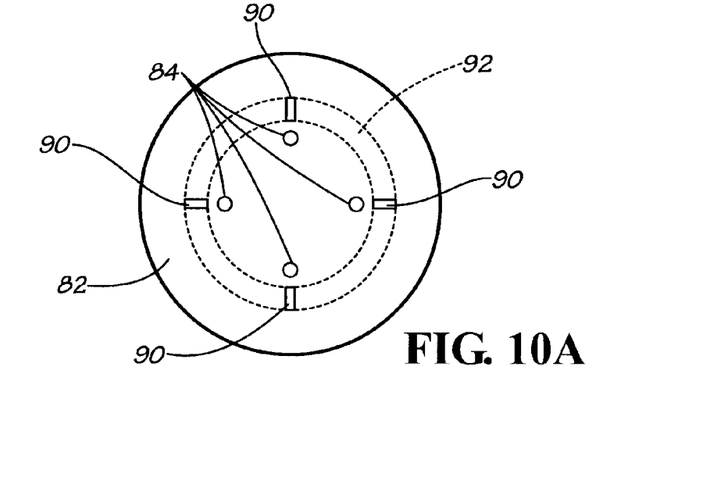
FIG. 10A is a plan view of the valve plate that is used in the vacuum retriever of FIG. 10.

As shown in FIG. 10, when high pressure air is moved downwardly through high pressure air conduit 96, the air channels 84 through the valve plate 82 are blocked by the downward movement of cup-shaped valve piston 92, thereby stopping the flow of air through the bellows 24.

When the bellows of FIGS. 7-10 are operated, the application of reduced air pressure from the plenum draws air into the lower chamber 54 of the bellows, through the valve plate supported in the bellows, and then into the upper chamber 52 and out of the bellows. When in this condition, and before the bellows is applied to a work product, the bellows is in its normal configuration. In the meantime, when the other bellows in the end effector are not in use and their air passages 58 and 84 are blocked by the valve elements 60 and 80, a reduced air pressure will be imposed on the upper chamber 52, causing the upper chamber of the bellows to contract vertically. This tends to slightly lift the bellows, moving the lower end of the bellows upwardly from the plane of the lower ends of the bellows that are in use. Thus, it is likely that the lower ends of the bellows that are not in use will be moved slightly upwardly with respect to the bellows that are in use, thereby improving the likelihood of accurate and sufficient engagement of the bellows in the proper zone of the end effector with the work product.

Figure 11:
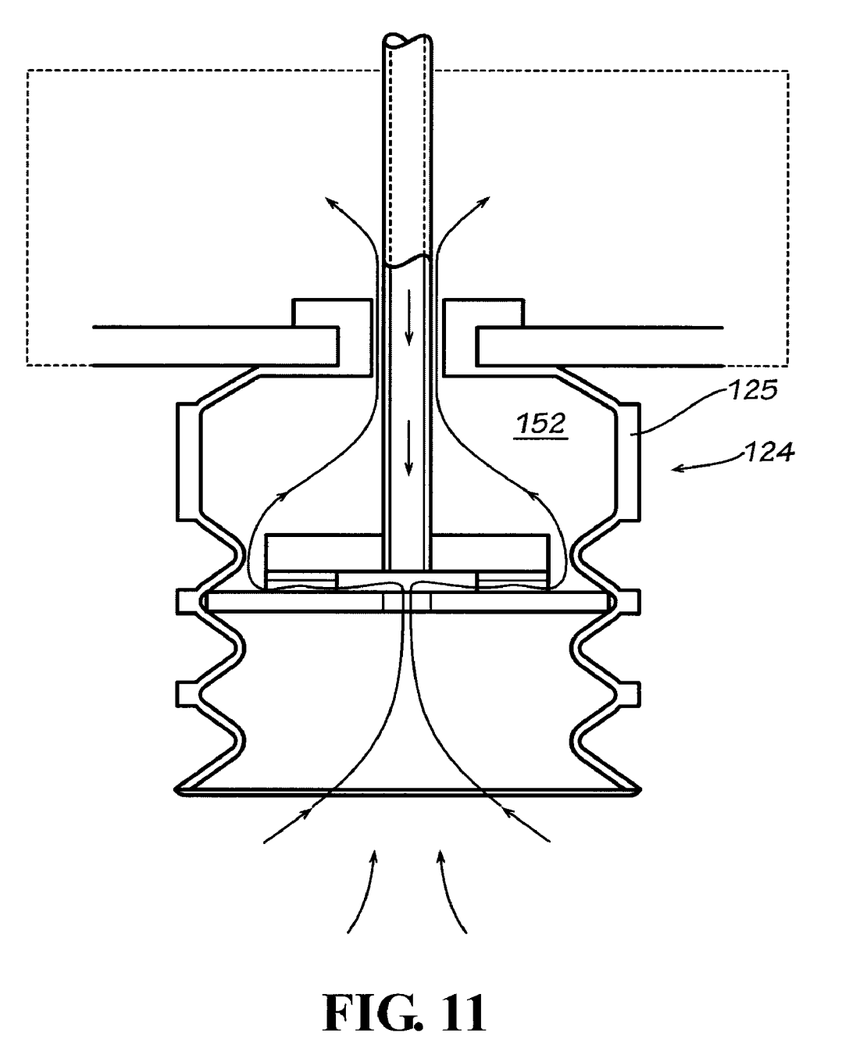
FIG. 11 is a side cross sectional view of a third embodiment of a vacuum retriever when the air control valve is open.

While FIGS. 7-10 show a common shaped bellows, it is not necessary that the upper chamber of the bellows be retractable. Accordingly, FIG. 11 shows a modified bellows 124 that has a substantially rigid annular side wall 125 in the upper portion of the bellows. This portion of the bellows is less retractable in response to the drawing of sub-atmospheric pressure in the upper chamber 152.

The high pressure conduit 64 or 96 is moveable vertically in response to the movement of the valve plate 56 or 82 so that it tends to reciprocate in the top wall opening 44 or 65 of the mounting collar 46 of the bellows. Since the openings 44 or 65 are larger in breadth than the high pressure conduit 64/96, an adequate air passage is maintained between the high pressure conduits and the facing surfaces of the mounting collar.

Although a preferred embodiment of the invention has been disclosed in detail herein, it will be obvious to those skilled in the art that variations and modifications of the disclosed embodiment can be made without departing from the spirit and scope of the invention as set forth in the following claims.

Therefore, having thus described the invention, the following is claimed:

1. An end effector for a robot for retrieving work products and placing the retrieved work products at a delivery site, said end effector comprising:
   a vacuum plenum housing,
   an array of vacuum retrievers extending down from said vacuum plenum housing for engaging the work products,
   a valve positioned in each said vacuum retrievers that separates each said vacuum retrievers into an upper chamber in communication with said vacuum plenum housing and a lower chamber in communication with the atmosphere for engaging the work products,
   said valves each defining an air passage between said upper chamber and said lower chamber for the movement of air from the lower chamber to the upper chamber and into said vacuum plenum, and a valve element comprising a diaphragm movable in said upper chamber into and out of blocking relationship with said air passage, wherein said upper chamber of said vacuum retrievers are configured to be moveable in response to closing of said air passage and a reduced air pressure drawn in said upper chamber.

2. The end effector of claim 1, wherein said vacuum retrievers in said lower chamber are cup-shaped bellows with annular protrusions.

3. The end effector of claim 2, wherein said bellows are constructed so that said bellows shrink and expand in response to the closing and opening of said air passages, respectively.

4. The end effector of claim 3, wherein said valve element comprises a control air application tube extending from said vacuum plenum housing downwardly into said upper chamber toward said air passage for directing control air toward said air passage, and means for moving said valve element into and out of engagement with said air passage.

5. The end effector of claim 1, wherein said vacuum retrievers are cup-shaped bellows with annular protrusions, and said valve is supported in said bellows at one of said annular protrusions.

6. The end effector of claim 1, wherein said valve includes a valve plate supported by said vacuum retrievers.

7. An end effector for a robot for retrieving work products and placing the retrieved work products at a delivery site, said end effector comprising:
   an array of vacuum bellows each having one end configured for fluid communication with a vacuum source and another end configured for fluid communication with the atmosphere and for engaging the work products,
   a valve positioned in said vacuum bellows that separates said vacuum bellows into an upper bellows chamber in communication with the vacuum source and a lower bellows chamber in communication with the atmosphere for engaging the work products,
   said valve comprising a valve seat defining an air passage between said upper bellows chamber and said lower bellows chamber for the movement of air from the lower bellows chamber to the upper bellows chamber and into said vacuum source, and a valve element comprising a diaphragm movable in said upper bellows chamber into and out of blocking relationship with said valve seat.

8. The end effector of claim 7, wherein said valve seat comprises a valve plate mounted in said bellows, an air passage formed in said valve plate, and said valve element arranged to move into and out of closed relationship with respect to said air passage of said valve plate.

9. The end effector of claim 7, wherein said vacuum bellows is cup-shaped and includes a series of wide and narrow annular folds, and said valve seat is supported in one of said wide annular folds.

10. An end effector for retrieving work products in a selected pattern from an accumulation of work products and for placing the retrieved work products in the selected pattern in a receptacle, the end effector comprising:
- a vacuum plenum source for maintaining a sub-atmospheric pressure,
- an array of vacuum retrievers in communication with said vacuum plenum source for engaging the work products,
- a diaphragm control valve mounted in each vacuum retriever of said array of vacuum retrievers for applying the sub-atmospheric air pressure of the vacuum plenum housing to each of the vacuum retrievers in a selected zone of the vacuum retrievers that are to retrieve work products while avoiding an application of the sub-atmospheric air pressure of the vacuum plenum housing to the vacuum retrievers that are not in the selected zone of the vacuum retrievers,
- a robot connected to the end effector for moving said end effector into predetermined attitudes with respect to the accumulation of work products to gather the work products from the accumulation of work products in a predetermined pattern on the vacuum retrievers.

11. The end effector of claim 10, wherein the vacuum retrievers are corrugated suction cups.

12. The end effector of claim 1, wherein said valve plate is movable with said bellows in response to the change of air pressure in said upper bellows chamber.

13. The end effector of claim 10, wherein said vacuum source comprises a vacuum plenum in fluid communication with said array of said vacuum retrievers.

* * * * *